Figure 1:
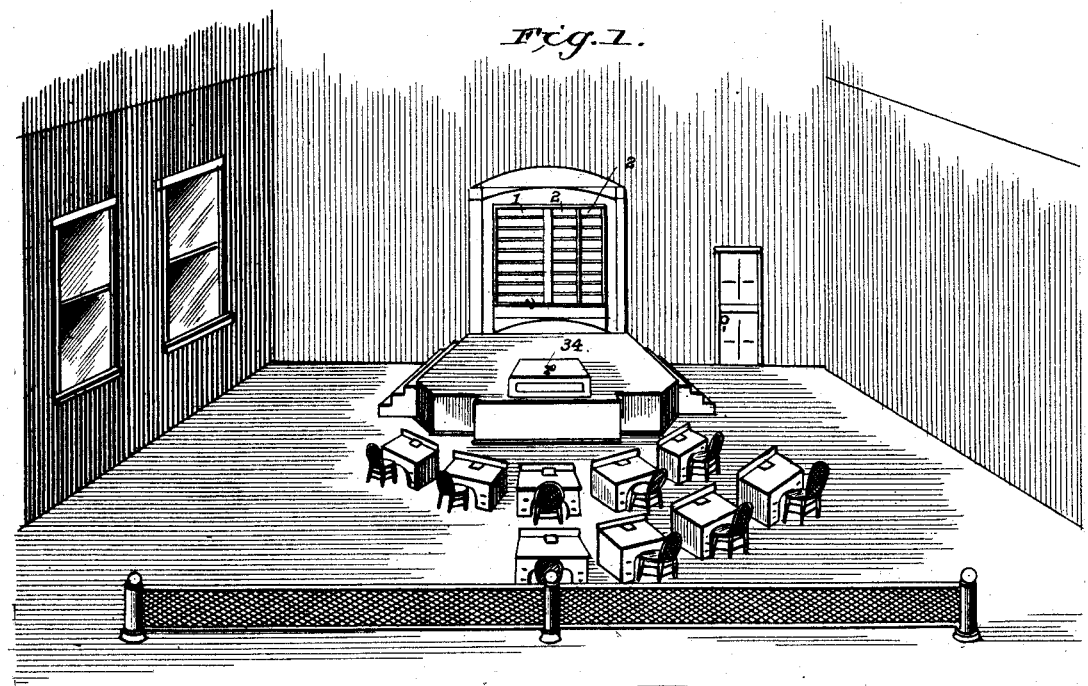

(No Model.) 3 Sheets—Sheet 1.

W. H. ROBINSON.
ELECTRIC VOTE INDICATOR AND RECORDER FOR LEGISLATIVE BODIES.

No. 420,964. Patented Feb. 11, 1890.

WITNESSES
Edwin I. Yewell
Jos. A. Ryan.

INVENTOR
William Harry Robinson
by Ross H. Read
his Attorney (No Model.) 3 Sheets—Sheet 2.

W. H. ROBINSON.
ELECTRIC VOTE INDICATOR AND RECORDER FOR LEGISLATIVE BODIES.

No. 420,964. Patented Feb. 11, 1890.

Fig. 2ᵃ

Fig. 2ᵇ

WITNESSES
Edwin L. Yewell.
Jos. A. Ryan.

INVENTOR
William Henry Robinson
by Robt H Rea
his Attorney (No Model.) 3 Sheets—Sheet 3.
W. H. ROBINSON.
ELECTRIC VOTE INDICATOR AND RECORDER FOR LEGISLATIVE BODIES.
No. 420,964. Patented Feb. 11, 1890.
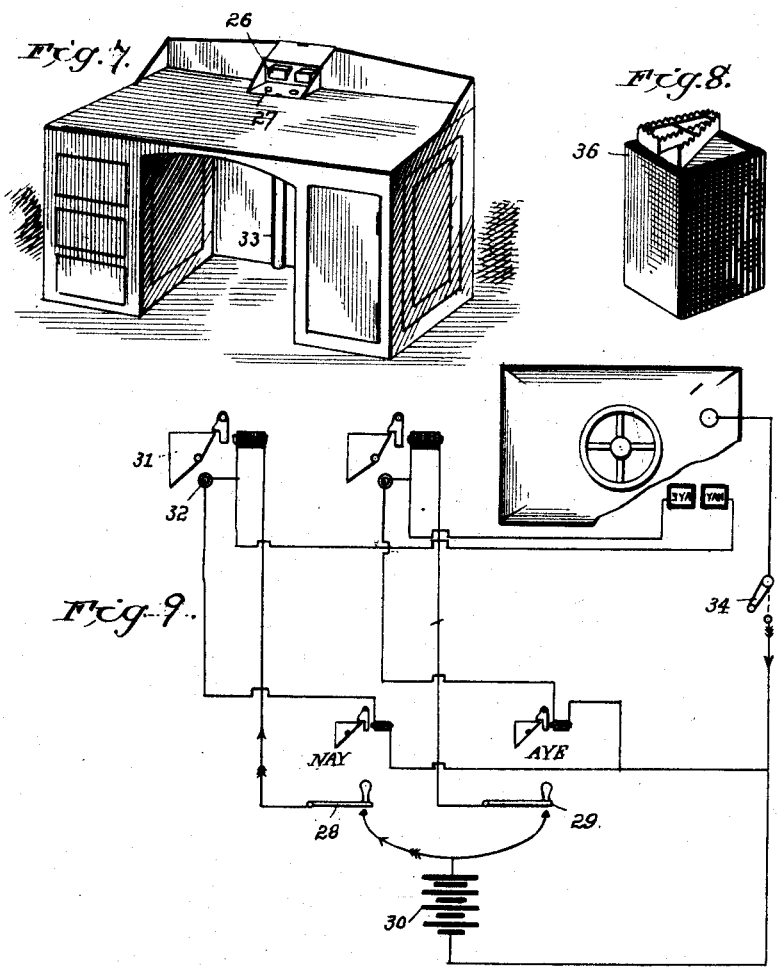
WITNESSES
Edwin L. Yewell,
Jos. A. Ryan.
INVENTOR
William Henry Robinson
by Ross H. Read,
his Attorney

UNITED STATES PATENT OFFICE.

WILLIAM HENRY ROBINSON, OF ROCHESTER, NEW YORK.

ELECTRIC VOTE INDICATOR AND RECORDER FOR LEGISLATIVE BODIES.

SPECIFICATION forming part of Letters Patent No. 420,964, dated February 11, 1890.

Application filed October 28, 1886. Serial No. 217,480. (No model.)

*To all whom it may concern:*

Be it known that I, WILLIAM HENRY ROBINSON, a citizen of the United States, residing at Rochester, county of Monroe, and State of New York, have invented certain new and useful Improvements in Electric Vote Indicators and Recorders for Legislative Bodies; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a system by which the votes of members of legislative or other parliamentary bodies may be instantly indicated and recorded, and to means whereby the result may be seen at a glance from any part of the parliamentary chamber, and by which each member's vote is telegraphed back to his desk and is there verified as to its character, whether aye or nay.

The object of the invention is to enable all of the members to vote contemporaneously or otherwise, thus saving a large amount of valuable time which is lost under the system of calling the roll now in vogue, and avoiding the confusion and mental diversion necessarily incident to such a procedure.

A further object is to indicate with unquestionable certainty the character of each individual vote, verifying the result at each voter's desk, as well as exhibiting the total result on an indicator visible from all parts of the chamber.

The advantages of such a system as will meet these requirements are manifold. No recapitulation of the entire vote is needed on the part of the clerk, as each voter has a reliable monitor under lock and key at his own desk to inform him whether his vote was recorded aye or nay. The rapidity with which a whole vote may be cast and lack of bustle and confusion in the proceedings are features highly advantageous in all deliberative assemblages composed of a large number of members.

It has heretofore been proposed to accomplish the ends noted above, but in all systems with which I am familiar deficiency in reliability of action or a tendency of the parts to get out of order has prevented their adoption.

To these ends my invention consists in an improved system and details of structure to guard against error or confusion, which will be hereinafter fully set forth in the specification, and definitely indicated in the claims.

Figure 2:
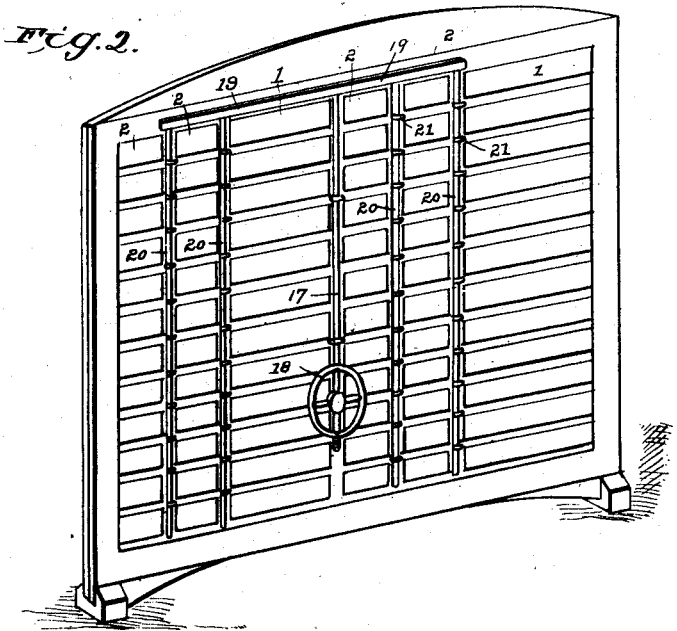
Figure 3:
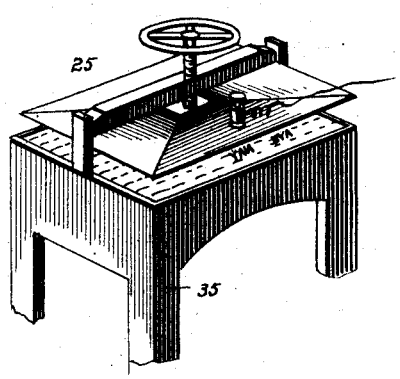
Figure 3:
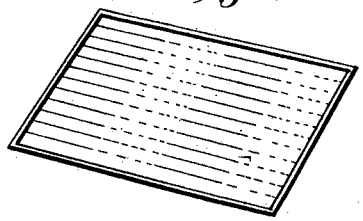
Figure 3:
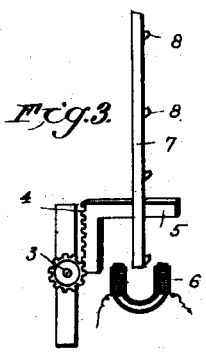
Figure 4:
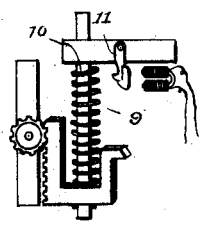
Figure 5:
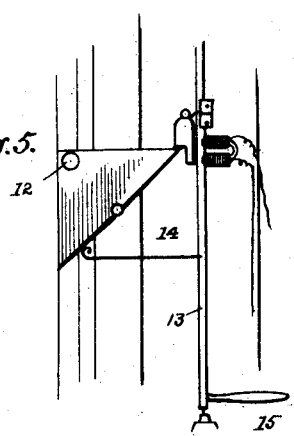
Figure 6:
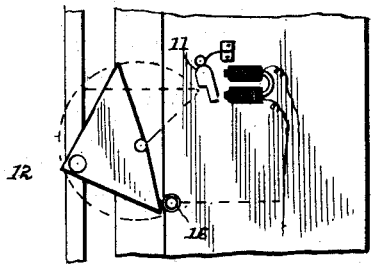

In the accompanying drawings, which illustrate my invention, Figure 1 is a view in perspective of a legislative chamber, showing the tabular frame in which are placed the names of the members and the indicating-tablets. Fig. 2 is a view in perspective of the back of this tabular frame or indicator, showing the means for restoring the tablets of the indicator after having been changed by the rendering of a vote, the electro-magnetic releasing devices for the tablet being omitted. Figs. $2^a$ and $2^b$ are details in perspective of the electro-chemical press and the frame carrying the sensitized paper for making a permanent record of the vote. Fig. 3 shows one form of indicating-tablet and the electro-magnetic mechanism by which it is displayed. Figs. 4, 5, and 6 are several forms of indicating-tablets and controlling devices. Fig. 7 shows a member's desk and equipment for transmitting a vote. Fig. 8 shows in perspective one of the types used in the recorder. Fig. 9 shows diagrammatically the circuit-connections from a single desk.

In front of the chamber is mounted a frame, such as shown in Fig. 2, in which a column at 1 is provided for the members' names, and columns 2 2 2 2 are provided for the tablets or indicator-drops which are to represent the character of the vote. These indicating-tablets may operate in any of the ways shown in the figures illustrating them, the ruling principle in all being that the tablet shall shift when a vote is being indicated, so as to completely fill the space given to it in both positions of rest—that is to say, whether it is indicating a vote by exposing a surface carrying a suitable symbol, or is merely exposing a plain surface. I regard this a feature of great importance, for the reason that the entire surface of the indicator should at all times be unbroken, so that the eye of an observer will read it as readily as a printed page of the same dimensions, and that the distinctness of the indications will not be marred by irregular outlines, the votes at all times being in a direct line with the names, and the blank spaces being likewise in line with the names corresponding thereto. A single glance will thus suffice to determine whether a given member has voted, and if so whether aye or nay.

In Figs. 3 and 4 the indicating-tablet is in the form of a rocking shutter. This is pivotally secured in the spaces 2 2 2 2. The pintle 3 carries a pinion which co-operates with a rack 4, carried by the armature 5 of an electro-magnet 6. In Fig. 3 the shutter is rocked by the direct pull of the magnet on the armature, the parts being restored to their normal condition by the rod 7, carrying pins 8—one pin for each shutter. The pins lift the armatures and their racks and restore the shutters to a position in which the blank face is exposed. In Fig. 4 the shutter is rocked by a spring 9, which is compressed by the rod 10 and held compressed by a catch or dog 11, co-operating with an extension on the rack-bar. Opposite this catch is located an electro-magnet, by which it is withdrawn from the rack-bar extension, the catch having a suitable armature attached to it.

Figs. 5 and 6 show gravity forms of drops. In Figs. 5 and 6 the tablet is substantially triangular in cross-section and pivoted on the hypotenuse-face. A suitable weight 12 may be secured to the outer edge to make the action more positive, and a magnetically-controlled catch 11 co-operates with the acute edge. A rock-shaft 13 carries a spring-arm 14, which, in the abnormal condition of the indicator, engages the hypotenuse-face of said indicator, so that when the shaft is rocked by the handle 15 the indicator will be raised and restored to its normal position—that is to say, with its blank surface exposed. In Fig. 5 the indicator is shown in its normal position, and in Fig. 6 in its abnormal position. A normally-open circuit-closer 16 lies within the sweep of each tablet, so that when it turns to its abnormal position a circuit to the corresponding member's desk is closed, and by means of an indicator at said desk the character of the vote is verified, as will presently be fully explained.

The indicator is provided with suitable means for restoring the tablets after they have been operated. That shown in Fig. 2 consists of a vertical rod 17, having a rack on its lower end co-operating with a wheel 18. Lateral extensions 19 19 on the top of this rod carry vertical rods 20 20—one for each column of tablets. These vertical rods have pins 21, which engage the tablet-restoring mechanism.

It will of course be understood that the aye and nay characters are inscribed on different tablets, any given tablet displaying or obscuring one of them in either of its two positions. As there are two tablets in line with each member's name, "aye—blank," "blank—nay," or "blank—blank" will be displayed accordingly, as the aye circuit-closer, the nay circuit-closer, or neither of them, is operated at the member's desk.

In the same circuit with the tablet-controlling magnets is an electro-chemical recorder for producing a permanent record of the entire vote. This is shown in Figs. 2$^a$ and 2$^b$.

In a suitable stand 35 are placed insulated metallic types 36, corresponding to the letters of aye or nay, or a single type may have the entire word in relief thereon. These types are preferably provided with a saw-face, as shown in Fig. 8, so that the points will make a good electrical contact with a sheet of sensitized paper when the latter is laid upon the types and the press-plate 25 is brought down upon the paper. On the sheet of paper are printed the names of the members in the full lines illustrated in Fig. 2$^b$. The paper may be moistened with any liquid which will produce a discoloration when electrolytically decomposed—as, for example, a watery solution of iodide of potassium and starch. The circuits lead into their respective types at the lower ends of the types, pass through the moist paper to the press-plate, and proceed thence by a common connection to the source of electrical energy. The vote is thus recorded by the same electric impulse which operates the tablet.

On each member's desk is a box provided with a lid which can be locked. The box contains an aye-and-nay circuit-closer and an aye-and-nay verifying-tablet. The tablets are shown at 26, Fig. 7, and the circuit-closers at 27. When either circuit-closer is operated, a tablet on the large central indicator is exposed, said tablet being in line with the name of the member on whose desk is located said circuit-closer. A spur on the tablet closes the verifying-circuit, when it strikes the circuit-closer 16 and exposes to the members' personal view in the box on his desk how his vote was recorded. The battery or other source of electric energy may be located in any part of the building.

In the diagram Fig. 9, 28 29 represent the circuit-closer at a member's desk, one contact being connected with the battery 30 and the other with a tablet-controlling magnet. Suppose circuit-closer 28 be operated. The current will flow in the direction indicated by the arrows, passing through the nay-type in the recorder corresponding to the operating member's desk. If the other circuit-closer be operated, the aye vote would be recorded. The depression of 28 releases 31 and closes a branch circuit at 32, which includes the nay-verifying tablet.

The verifying-tablets may be arranged similarly to the tablets in the indicator and constitute a permanent index, until reset, of the last vote made by their operating members.

The circuit-wires are conducted from the desks through a suitable conduit (shown at 33) to the floor, thence to the various translating devices to be operated.

On the speaker's desk is located a switch (shown diagrammatically in Fig. 9 at 34) by which the circuit may be changed so as to put it beyond the power of a member to vote except when the speaker so desires, as when the speaker's switch is open no current can flow over the indicating-circuits, whether the member's circuit-changers are manipulated or not.

Having thus described my invention, what I claim, and desire to secure by Letters Patent, is—

1. An indicator consisting of a suitable tabular frame provided with a series of name-spaces and a series of indicating-spaces corresponding thereto, the name-spaces being in consecutive order in a column, and the indicating-spaces being in a similar order in a parallel column, each name-space carrying a fixed name, and each indicating-space being provided with a movable indicating-shutter, and an electro-magnet provided with circuit-connections for controlling the movement of the shutter, whereby each indication may be noted at a glance.

2. An indicator consisting of a suitable tabular frame provided with a series of name-spaces and a series of indicating-spaces corresponding thereto, the name-spaces being in consecutive order in a column and the indicating-spaces being in a similar order in a parallel column, each name-space carrying a fixed name, and each indicating-space being provided with a rocking indicating-tablet having a plain face and a character-face, the plain face being normally exposed, and an electro-magnet provided with circuit-connections for controlling the movement of the tablet, whereby each indication may be noted at a glance.

3. The combination of a centrally-pivoted indicating-tablet having its alternate sides of different signification, a frame provided with openings in which the tablet is supported, the face of the frame being in the same plane with the exposed face of the tablet and closely surrounding the same, whereby in either position of the tablet the opening is completely filled and a smooth indicating-surface is exposed, and an electro-magnet and circuit-connections for rocking the tablet.

4. The combination of a centrally-pivoted indicating-tablet having alternate indicating-faces, a frame provided with openings in which said tablet is pivoted, the face of the frame being in the same plane with the exposed face of the tablet and closely surrounding the same, a weight secured to the tablet to cause it to gravitate when released, a detent supporting the tablet, and an electro-magnet and circuit-connections for withdrawing said detent.

5. In an electro-chemical recorder, the combination of the recording-press, metallic types having a serrated recording-face, and circuit-connections whereby an electric current may be passed through the type and press.

6. A record-sheet for an electro-chemical recorder having a series of names printed thereon and provided with spaces opposite said names, said spaces being saturated with a material which will discolor under electric transmission.

7. In an electric indicator, the combination of an indicating-circuit, an electro-magnet in said circuit, an indicating-tablet controlled by said electro-magnet, a verifying-circuit, a verifying-tablet in said circuit located at the operator's station, said tablet adapted to remain fixed in either of its extreme positions, and a circuit-changer controlled by the drop of the indicating-tablet so as to instantly transmit a signal to the operator, whereby a signal may be verified and the verification continue until the verifying-tablet is reset.

8. In a legislative-vote-indicating system, the combination of an indicator-circuit, indicating-tablets, and electro-magnets for controlling the same in branches of said circuit, a series of members' circuit-changers corresponding to the tablets distributed throughout the legislative chamber, verifying-circuits, verifying-tablets in said circuits, said tablets being normally held by detents and provided with electro-magnets in the verifying-circuits, a circuit-changer in each verifying-circuit controlled by the indicating-tablet, and a switch in the indicator-circuit under control of the presiding officer to place the indicators in or out of circuit with the members' circuit-changers, said switch controlling only the indicator-circuit, whereby the entire vote can be taken and verified.

9. In a legislative-vote-indicating system, the combination of an indicator-circuit, indicating-tablets, and electro-magnets for controlling the same in branches of said circuit, a series of members' circuit-changers corresponding to the tablets distributed throughout the legislative chamber, a recorder in circuit for leaving a permanent record of the vote, verifying-circuits, verifying-tablets in said circuits at the members' desks, each tablet being normally held by a detent and provided with a controlling electro-magnet in the verifying-circuit, and a circuit-changer in each verifying-circuit controlled by its indicating-tablet, whereby every vote is recorded, indicated, and verified.

10. The combination of the recording-press, metallic aye and nay types therein, circuit-connections of said types with the members' desks, a series of members' circuit-changers corresponding to said types, a record-sheet having a series of names printed thereon and provided with spaces opposite said names, said spaces being saturated with a material which will discolor under electric transmission, and a switch under the control of the presiding officer to place said members' circuit-changers in or out of circuit, whereby a complete record of the individual vote may be obtained.

WILLIAM HENRY ROBINSON.

Witnesses:
GEORGE R. COATES,
HAMLET S. BRIGGS.